United States Patent [19]
Wintour

[11] Patent Number: 5,987,098
[45] Date of Patent: Nov. 16, 1999

[54] METHOD AND SYSTEM FOR SPARING ECHO CANCELLERS

[75] Inventor: Justin Wintour, Nepean, Canada

[73] Assignee: Nortel Networks Corporation, Montreal, Canada

[21] Appl. No.: 08/996,772

[22] Filed: Dec. 23, 1997

[51] Int. Cl.[6] ............................. H04M 1/24; H04M 1/00
[52] U.S. Cl. ................. 379/3; 379/410; 370/286
[58] Field of Search ................ 379/3, 406, 410, 379/411; 370/286, 290, 291; 455/570; 381/66

[56] References Cited

U.S. PATENT DOCUMENTS

| | | | |
|---|---|---|---|
| 5,450,487 | 9/1995 | Lahdemaki et al. | 379/410 |
| 5,535,194 | 7/1996 | Ashley et al. | 370/286 |
| 5,663,955 | 9/1997 | Iyengar | 370/291 |

*Primary Examiner*—Paul Loomis

[57] ABSTRACT

A telephone communications switching system incorporating echo cancellers that may be replaced by other echo cancellers, and a method for replacing such echo cancellers are disclosed. The system comprises a control module for receiving and switching call data; and active and redundant echo cancellers. Under normal operation, an active echo canceller cancels echo in a call. A processor on the control module monitors the system and in the response to a sensed trigger event activates the redundant echo canceller and switches call data at the input of the active echo canceller to inputs of both the active and redundant echo cancellers. The processor then waits a determined amount of time; and thereafter disconnects the output of the active echo canceller from the control module and connects the output of the redundant echo canceller to the control module. By waiting, the processor allows the redundant echo canceller to become ready to cancel echo, before connecting the output of the redundant canceller to the control module. This may reduce the amount of time echo cancelling is not available for the call.

18 Claims, 6 Drawing Sheets

METHOD AND SYSTEM FOR SPARING ECHO CANCELLERS

FIELD OF THE INVENTION

The present invention relates to a telephone communications switching system incorporating echo cancellers that may be replaced by other echo cancellers, and a method for replacing such echo cancellers.

BACKGROUND OF THE INVENTION

The presence of echo in telephone networks is known and understood.

Echos typically exist as a result of transmitted signals in a telephone network being coupled into a return path and fed back to the sender of the original transmitted signal. The most common cause of such a coupling is an impedance mismatch in a four wire to two wire hybrid. The impedance mismatch causes a reflection of some of the power transferred across the hybrid. A sender will receive the portion of a transmitted signal reflected by the impedance mismatch a short time after sending the original signal. Depending on the delay between the original and reflected signal, the reflected signal will create an echo perceived by the sender.

Echos can be avoided if the impedance of the hybrid exactly matches the impedance of the two wire circuit so that near perfect isolation of the two, two wire branches (or legs) of the four wire circuit can be realized. Such impedance matching is a time consuming manual process and is therefore not commonly used. Further, two wire circuits emanating from hybrids are typically switched connections such as customer sets, so that the impedance of the two wire line connected to the hybrid is rarely matched.

Numerous methods of reducing or eliminating echo are known. For example, telephone network design introduces specific amounts of net loss called via net loss ("VNL") that depends on the length of the link and typically creates end to end attenuation in proportion to the length of the circuit. An echo experiences twice as much attenuation as does a transmitted signal since it traverses twice the distance. Thus, the VNL may be relied upon to sufficiently suppress echos having thirty to forty milliseconds of delay. However, reliance on VNL is not appropriate for echos having longer delays.

Instead, echo suppressors and echo cancellers are typically deployed.

Echo suppressors operate on four wire circuits by measuring the speech power in each two wire portion (leg) of the circuit and introducing a large amount of loss in one leg when the power level in the other leg exceeds a threshold. Thus, a returning echo is essentially blocked by a high level of attenuation. However, an echo suppressor converts a full duplex circuit into a half duplex circuit with the energy sensed being the means of turning the circuit around. As a consequence, echo suppressors tend to clip beginning portions of speech segments. For example when a party at one end of the connection begins talking at the tail end of the other parties speech the echo suppressor does not have time to reverse directions.

A further and much preferred method of reducing or eliminating echo is echo cancellation. An echo canceller operates by simulating the echo path to subtract a properly delayed copy of a transmitted signal from the received signal to remove or cancel the echo component.

In a digital telephone network, echo cancellation is usually accomplished by applying digital signal processing ("DSP") techniques to pulse code modulated ("PCM") voice data. Echos are cancelled close to the point of reflection so that the delays the echo canceller must simulate are minimized.

Known DSP echo cancellation algorithms, as for example disclosed in U.S. Pat. No. 5,343,522, use call data from a far end caller (ie. call data without echo) and a signal traveling in the opposite direction, including a near end echo, to form a suitable adaptive filter. The filter is modeled by correlating the original signal with the return signal containing echo. The formed filter is suitable for removing the echo component of the return signal without noticeably modifying the remainder of the signal. The filter is updated periodically and is applied to all signals along the return path, destined to the speaker at the far end.

As will be appreciated, the initial formation of a suitable filter takes some time in order to effectively correlate the return signal portion including echo to the originating signal. An echo canceller that has been properly matched to a particular call is said to be "converged". The exact amount of time for convergence will vary from call to call depending on the nature of the echo and the nature of the call. For example, in the presence of an additional signal in the return path, signal correlation and hence echo canceller convergence is difficult, if not impossible. Therefore cancellers converge most effectively in the absence of signals originating at both ends of a call (often referred to as "double talk"). In the absence of significant "double talk", formation of a suitable filter may be much simpler and less time consuming. Present DSP echo cancellation algorithms typically require approximately two to three seconds to form a suitable filter for most calls.

Physically, echo cancellers are usually hardwired in series with trunks connecting telephone switching systems. As well, echo cancellers are typically installed on T1 lines, having twenty-four DS0 channels. As a result, echo cancellers are often bundled in units capable of providing echo cancelling service for a T1 trunk having twenty-four voice channels.

This hardwiring of echo cancellers leads to the problem that a failed canceller may be tantamount to a failed trunk. Some suggested solutions to this problem have involved the use of redundant hardware or hardware bypasses in the event of failure of the echo cancellers. Redundancy, however, is typically limited so that multiple hardware failures cannot be compensated. Moreover, hardware bypasses eliminate the provision of echo cancellation on at least one channel and typically on an entire trunk.

A much improved method of providing echo canceller redundancy is disclosed in copending U.S. patent application Ser. No. 08/851,026, the contents of which are hereby incorporated by reference. Basically, the disclosed method employs a communications switching system capable of switching individual calls to and through individual echo cancellers, in a pool of echo cancellers, as required. In the event a single echo canceller fails, this system could switch a call in need of echo cancellation to another available canceller. The echo cancellers are formed as part of resource modules ("RMs") forming part of a modular communications system. For design reasons, an RM dedicated to providing echo cancelling (known as an echo canceller resource module "ECRM") in the disclosed system typically has two hundred and eighty eight cancellers. Each canceller cancels echo in one direction in a single call. As a result a single ECRM may be associated with up to two hundred and eighty eight calls at one time.

While such a system may be capable of switching individual calls between available echo cancellers across ECRMs in the event of an echo canceller failure, replacement of an entire ECRMs is often desirable. Such replacement may be performed dynamically while the system is in operation. All calls processed by an active ECRM may be switched through a redundant ECRM. That is, an active ECRM is logically disconnected from the system and a redundant ECRM is connected. The dynamic replacement of an active (ie. in-use) ECRM with a redundant (ie. inactive) ECRM is referred to as "sparing" of that ECRM.

However, when calls are switched from echo cancellers on an active ECRM to echo cancellers on a redundant ECRM each newly used echo canceller will need to "converge". As a result, the switching from an active echo canceller to a redundant echo canceller effectively removes echo cancellation from the call for the amount of time required for convergence. In the event of a failed echo canceller, this delay is quite tolerable in view of the benefits provided by replacing the failed canceller.

However, when all calls on a single ECRM are switched to a redundant ECRM, all redundant echo cancellers on the redundant ECRM will need to converge, whether or not the corresponding active echo canceller on the active ECRM has failed. This, of course, will cause the presence of echos for a short period, on all calls associated with the active and redundant ECRMs.

The present invention attempts to overcome some of the disadvantages associated with present methods of replacing or "sparing" echo cancellers in a telephone communication switching system.

SUMMARY OF THE INVENTION

It is an object of the present invention to reduce the time interval during which echo cancelling services for a call are unavailable, when an active echo canceller is replaced with a redundant echo canceller.

Advantageously, the present invention allows the concurrent replacement of functioning and non-functioning echo-canceller while minimizing loss of echo canceller services on calls associated with functioning echo cancellers.

In accordance with an aspect of the present invention there is provided, a method of replacing a first active echo canceller in a communications system with a second echo canceller, the first echo canceller initially having an input connected to the system for receipt of call data from the system and an output connected to the system for provision of call data to the system, the method comprising the steps of: a. activating the second echo canceller and providing call data at the input of the first echo canceller to inputs of both the first and second echo canceller; b. waiting a determined amount of time; and c. disconnecting the output of the first echo canceller from the system and connecting an output of the second echo canceller to the system.

In accordance with another aspect of the present invention there is provided, a communications switching system comprising: a control module for receiving and switching call data; an active echo canceller having an input and an output connected to the control module for exchange of call data and for cancelling echo in a call; a redundant echo canceller connected to the control module. The control module comprising a switch for switching call data between the control module and the active and redundant echo cancellers; a processor in communication with the switch and the active and redundant echo cancellers. The processor is adapted to monitor the system, and in response to a sensed trigger event: a. activate the redundant echo canceller and switch call data at the input of the active echo canceller to inputs of both the active and redundant echo cancellers; b. wait a determined amount of time; and c. disconnect the output of the active echo canceller from the control module and connect an output of the redundant echo canceller to the control module, after the determined amount of time.

In accordance with yet another aspect of the present invention there is provided a telephone communications switching system comprising: a control module for receiving and switching call data; a first resource module comprising an active echo canceller having an input and an output connected to the control module for exchange of call data and for cancelling echo in a call; a second resource module comprising a redundant echo canceller connected to the control module. The control module comprises a switch for switching call data between the control module and the first and second resource modules, for processing at the first and second resource modules and a processor in communication with the switch and the first and second resource modules. The processor is adapted to monitor the system and in response to a sensed trigger event: a. activate the redundant echo canceller and switch call data at the input of the active echo canceller to inputs of both the active and redundant echo cancellers; b. wait a determined amount of time; and c. disconnect the output of the active echo canceller from the control module and connect an output of the redundant echo canceller to the control module, after the determined amount of time.

In accordance with a further aspect of the present invention there is provided a telephone communications switching system comprising: a control module for receiving and switching call data; a first resource module comprising a first plurality of active echo cancellers each having an input and an output connected to the control module for exchange of call data and for cancelling echo in a call; and a second resource module comprising a second equal plurality of redundant echo cancellers connected to the control module. The control module comprises a switch for switching call data between the control module and the first and second resource modules, for processing at the first and second resource modules. The processor is in communication with the switch and the first and second resource modules. The processor is adapted to monitor the system and in response to a sensed trigger event: a. activate the plurality of redundant echo cancellers and switch call data at an input of each the active echo cancellers to an input of each the active and redundant echo cancellers; b. wait a determined amount of time; and c. disconnect the outputs of the active echo cancellers from the control module and connect an output of each of the redundant echo cancellers to the switch to switch call data from the redundant echo cancellers to the switch, after the determined amount of time.

BRIEF DESCRIPTION OF THE DRAWING

In figures, which illustrate by way of example, preferred embodiments of the invention.

DETAILED DESCRIPTION

Figure 1:
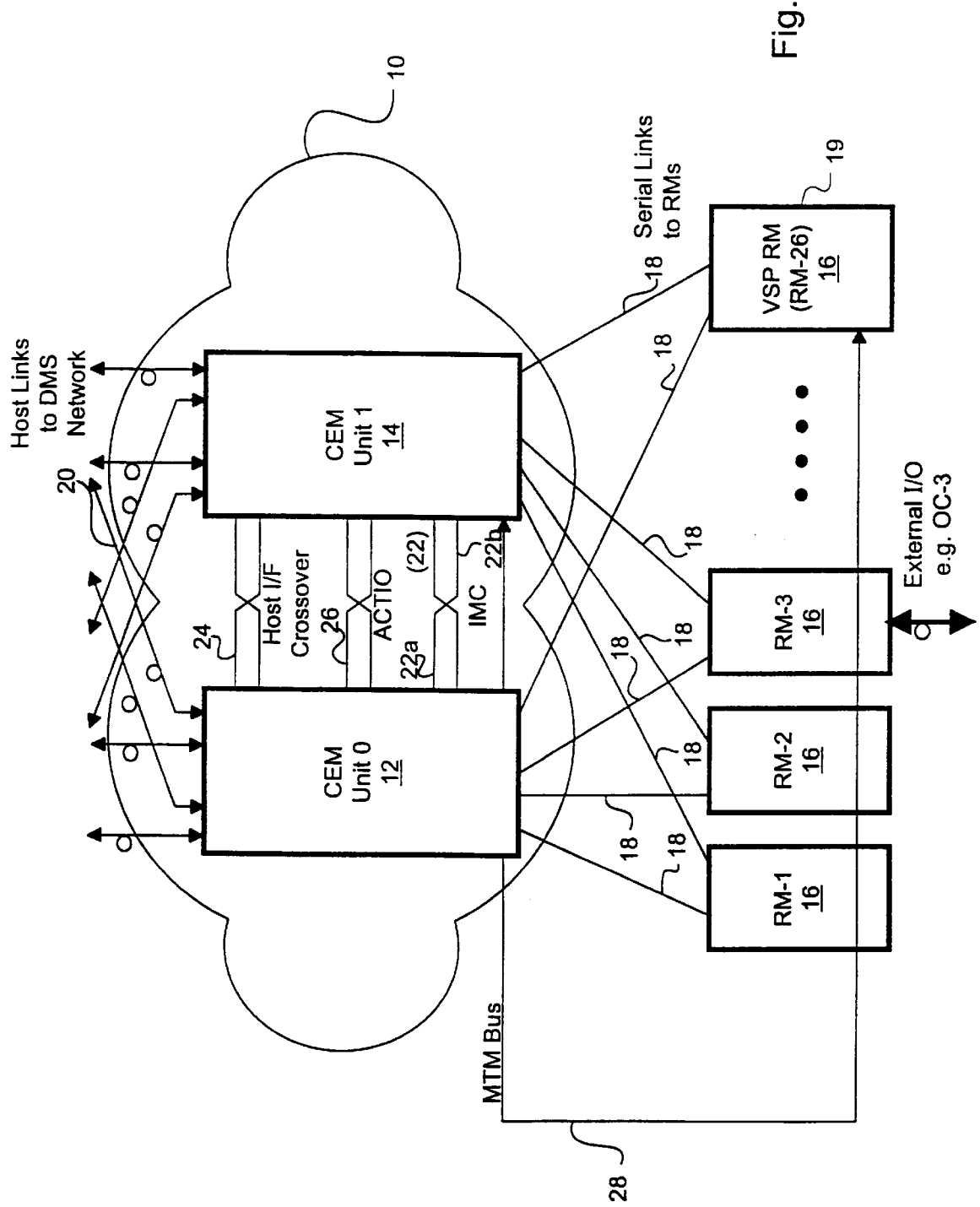
FIG. 1 is a block diagram of a telephone communications switching system in accordance with an aspect of the present invention.
Figure 2:
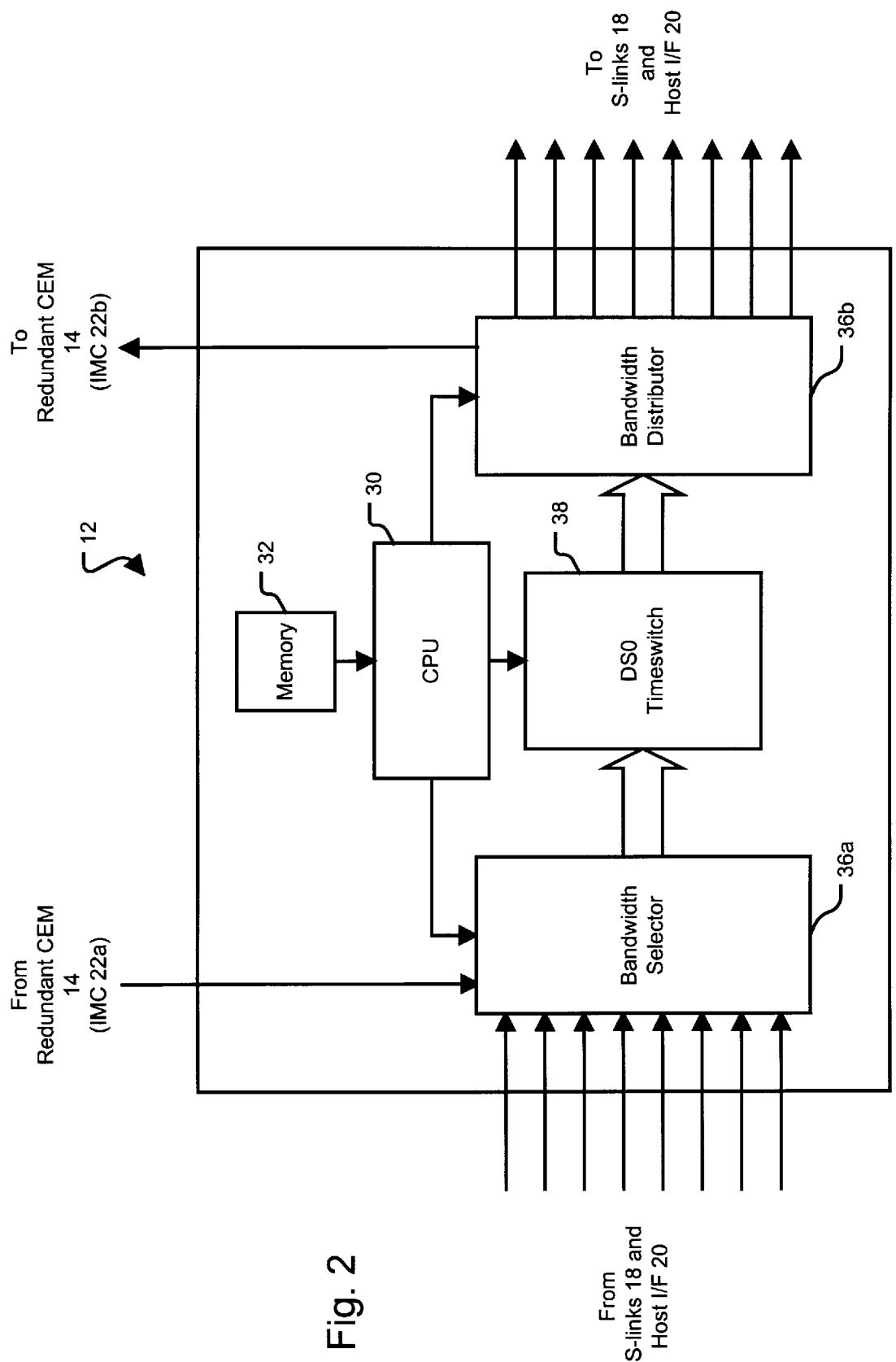
FIG. 2 is a block diagram of one of the components of the system of FIG. 1.
Figure 4:
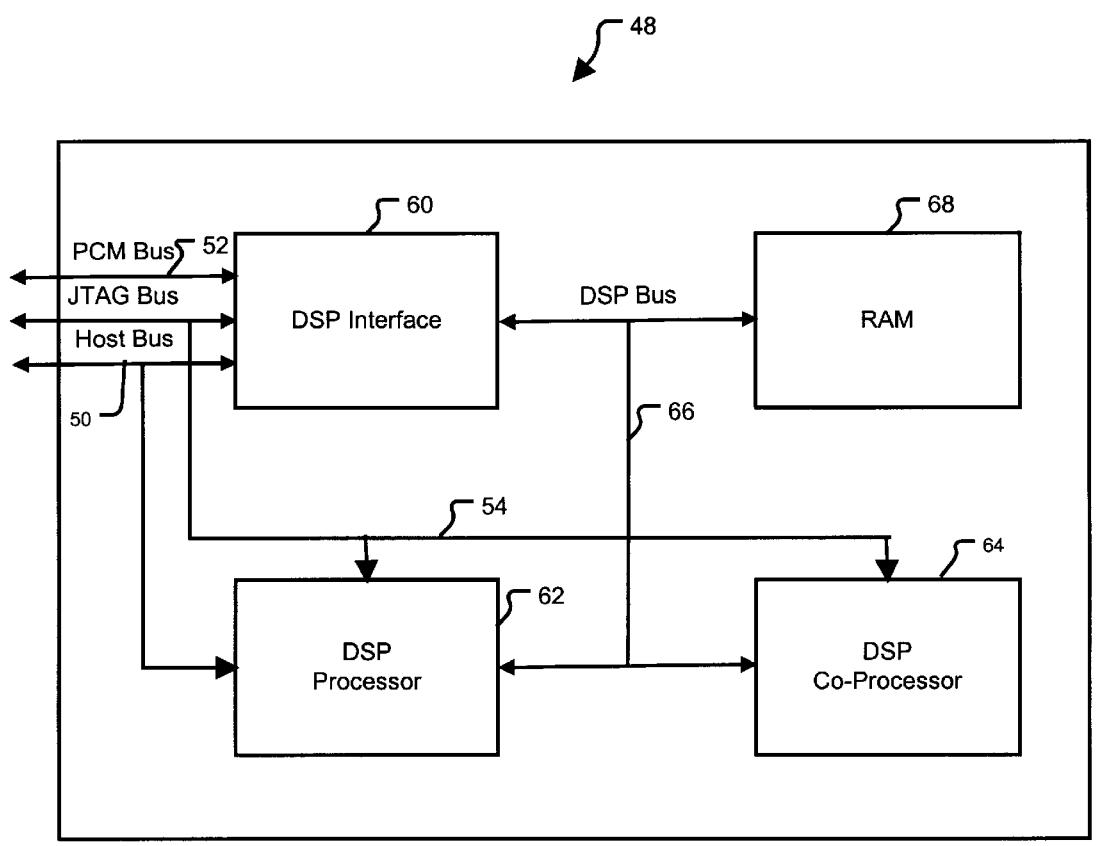
FIG. 4 is a block diagram of one of the components of the component of FIG. 3.
Figure 5:
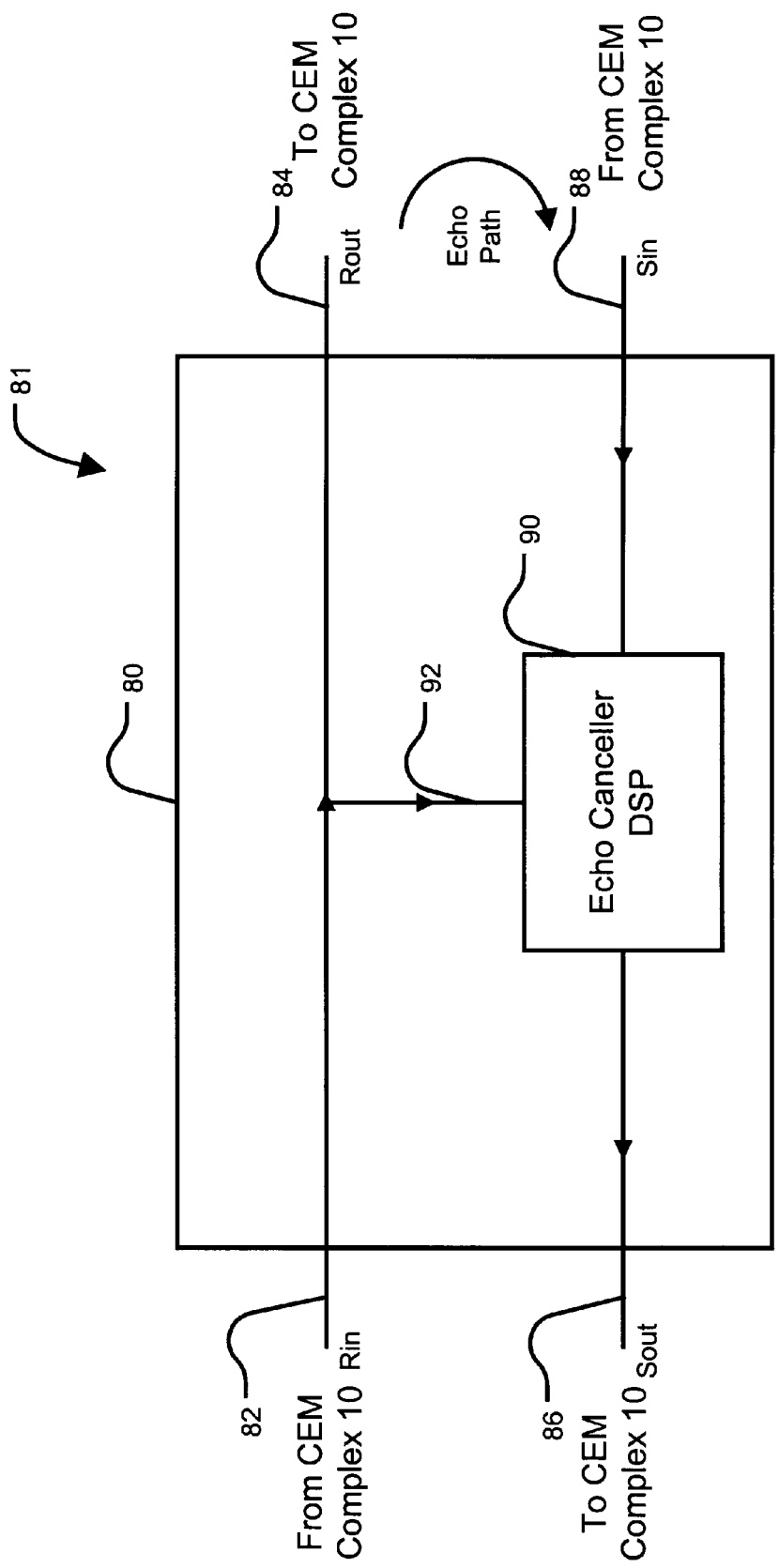
FIG. 5 is a block diagram of an echo canceller.
Figure 6:
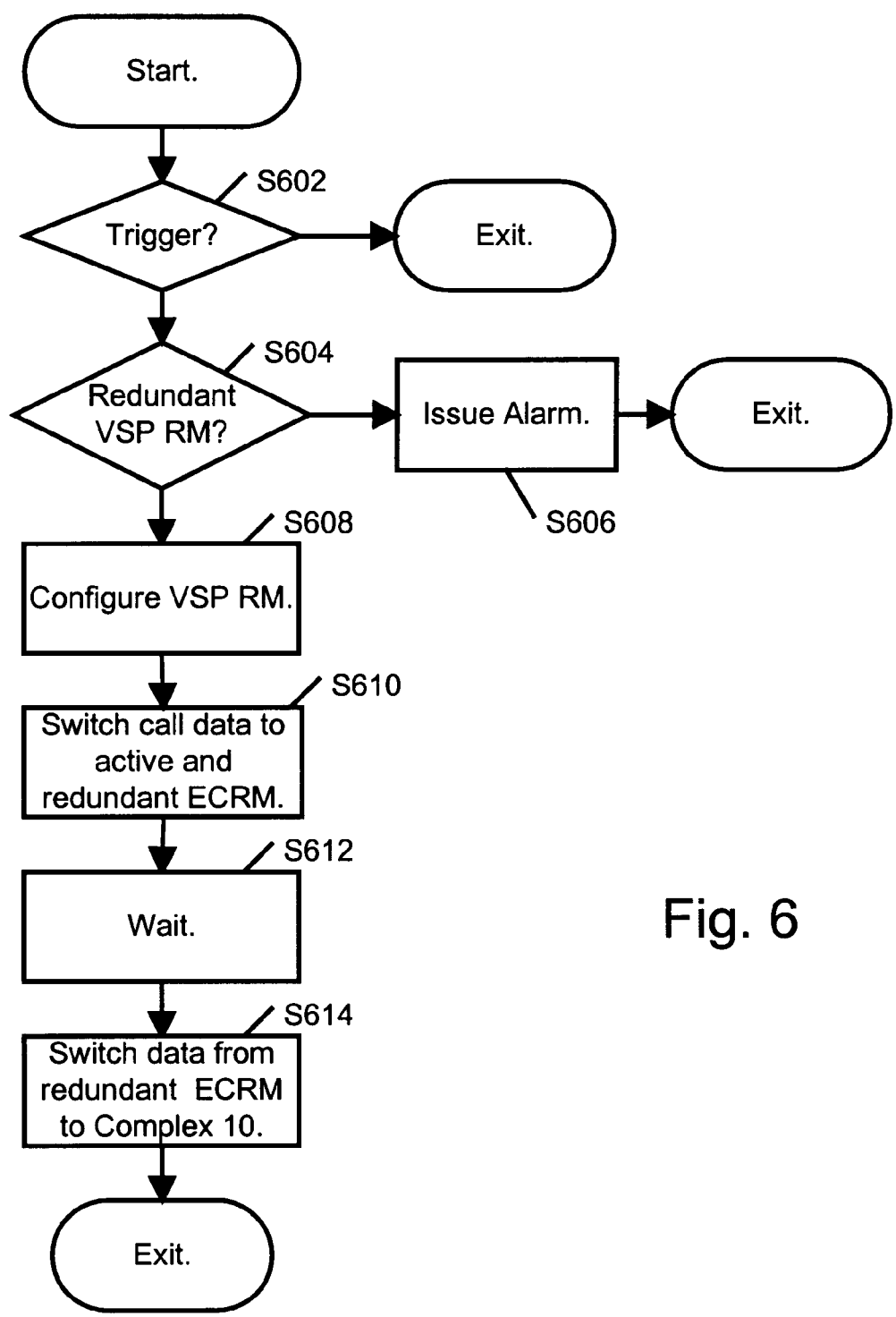
FIG. 6 is a flow chart of a method in accordance with an aspect of the invention.

FIG. 1 illustrates, in block diagram, a specific modular communications system, capable of switching individual calls received at the system, through individual echo cancellers that form part of the system. An individual echo canceller is schematically illustrated in FIG. 5. FIG. 2 illustrates a portion of the communications system of FIG. 1, responsible for switching received calls between a host communications system and/or resource modules. Resource modules provide echo cancelling capabilities, so that the system may switch individual calls to available echo canceller resource modules. A resource module capable of providing echo cancelling is illustrated in block diagram in FIG. 3. FIG. 4 illustrates DSP islands forming part of the module of FIG. 3. Lastly, a flow chart illustrating a method for sparing echo cancellers used by the system of FIG. 1, is illustrated in FIG. 6.

FIG. 1, illustrates in block diagram the architecture of a modular communications system 11, as more particularly described in U.S. patent application Ser. No. 08/721,095, the contents of which are hereby incorporated by reference. A common equipment module ("CEM") complex 10 comprises two control modules ("CEM"s) 12 and 14. Each CEM 12, 14 is connected to a plurality of resource modules 16 ("RMs") by way of resource module links 18. CEMs 12, 14 switch call data between the CEMs 12, 14 and RMs 16. The resource module links 18 are also referred to as S-Links.

The two CEMs 12, 14 operate in redundancy, and are interconnected by intermodule communications link 22a, 22b; host data cross-over interface 24; and activity arbitration link 26. One CEM (12 or 14) is active, while the other remains inactive. Inactive CEM (14 or 12) is normally in standby mode ready to become active in the event of a failure on the presently active CEM (12 or 14). The exchange of activity between CEMs 12, 14 is governed by software and hardware in each CEM 12, 14.

CEMs 12, 14 may further be interconnected to higher nodes in a host communications system (as for example DMS™ switch equipment—not shown) by way of host interface 20 for the exchange of data with the host system. This allows the communications system 11 to function as a peripheral subsystem.

CEM complex 10 is the center for overall control and co-ordination of the communications system. Complex 10 switches received calls between a host communications system and/or RMs 16 and co-ordinates the setup and takedown of connections between RMs 16 or between RMs 16 and host interface 20, in response to requests from the host communications system. Complex 10 further allocates and de-allocates system resources to calls and call events and coordinates resource module sparing operations and diagnostic operations.

Each resource module link 18 is electrically isolated from every other resource link 18, effecting point-to-point connectivity between RMs 16 and CEMs 12, 14. This allows for the isolation and easy detection of module failures. The ambiguity in the location of a fault is limited to at most two modules and the link between them.

RMs 16 and CEM complex 10 are further interconnected by MTM test and maintenance bus 28, used to initiate self tests and pass data from RMs 16.

FIG. 2 is a block diagram illustrating the partial architecture of CEM 12. CEM 14 (FIG. 1) is identical. Each CEM 12, 14 comprises three switching matrices: bandwidth selector 36a; timeswitch 38; and bandwidth distributor 36b. The bandwidth selector 36a is interconnected with S-links 18 and host interface 20 to transfer data from RMs 16 and the host to CEM 12 or 14. Bandwidth distributor 36b is interconnected to S-links 18 and to host interface 20 to provide data to RMs 16 and the host. Timeswitch 38 is connected between bandwidth selector 36a and bandwidth distributor 36b. Bandwidth selector 36a provides call data to timeswitch 38, and timeswitch 38 provides call data to bandwidth distributor 36b. Bandwidth selector 36a, and bandwidth distributor 36b, are coarse granularity time division multiplex ("TDM") switches allowing switching of timeslots from RMs 16 or the host system in groups of thirty-two DS0 channels or timeslots on S-links 18. Bandwidth selector 36a and bandwidth distributor 36b are collectively referred to as a bandwidth allocator. They are interconnected for direct exchange ot call data by connection 37. Timeswitch 38, on the other hand is a TDM switch allowing for the switching of individual timeslots, and thus DS0 channels, within a group. A processor comprising microprocessor 30 and associated memory 32 (RAM and/or ROM) under software control governs the overall operation of CEM 12 including switching by bandwidth selector 36a; timeswitch 38; and bandwidth distributor 36b.

RMs 16 (FIG. 1) supply payload processing capabilities to the communications system 11. The number and type of RMs 16 required is application and provisioning dependent. RMs 16 can be broadly categorized by the type of resource they supply: interface (e.g. OC-3 Carrier); PCM services (e.g. tone detection & generation, echo cancelling); messaging services (e.g. HDLC message format translation); or computing services.

This modular design allows a communications system having specific functionalities to be assembled from a small set of generalized components (ie. RMs 16 and CEM 12, 14). To provide sufficient and scalable control processing, distributed computing techniques are employed, with each RM 16 having its own processing capability and performing local low-level control functions under supervision of a central control component (ie. a CEM 12, 14). Thus, telecom functions are physically separated into control, interface, signalling and service modules. The architecture allows for efficient utilization of the switching function of CEMs 12, 14 and RMs 16 by providing a means by which the amount of payload data exchanged with RMs 16 can be varied to match the requirements of a particular service circuit implementation.

All RMs 16 share a common interface definition (S-Link) to the CEMs 12, 14. The maximum available payload bandwidth to an RM 16 can be increased by replicating the physical S-Link interface as required, by utilizing primary and secondary S-links. This enhances provisioning flexibility by limiting the number of distinct physical RM interface slot types.

S-links 18 connecting RMs 16 to complex 10 are serial links and are more particularly described in co-pending U.S. patent application Ser. No. 08/773,956, the contents of which are hereby incorporated herein by reference. These serial links, transport payload voice and data bytes between the CEM complex 10 and the RMs 16;

transport the system clock from the CEM complex 10 to RMs 16;

transport the CEM activity state from the CEM complex 10 to RMs 16;

transport low-level control (including RM reset control) from the CEM complex 10 to the RMs 16, and low level status from the RMs 16 to the CEM complex 10;

transport high level control and status between the CEM complex 10 and the RMs 16 (messaging);

detect the presence or absence of an RM 16 by the CEM complex 10; and detect transport errors induced by electrical noise or other mechanisms.

Each RM 16 has two links, one connecting it to each CEM 12, 14 within the CEM complex 10. Each of these links can be activated depending on sparing architecture for a particular RM. Each of these logical links may contain several physical S-links, one primary link and a number of secondary links. One of the RMs 16, as illustrated, is a voice service processor RM 19 ("VSP RM"), capable of providing PCM services.

Figure 3:
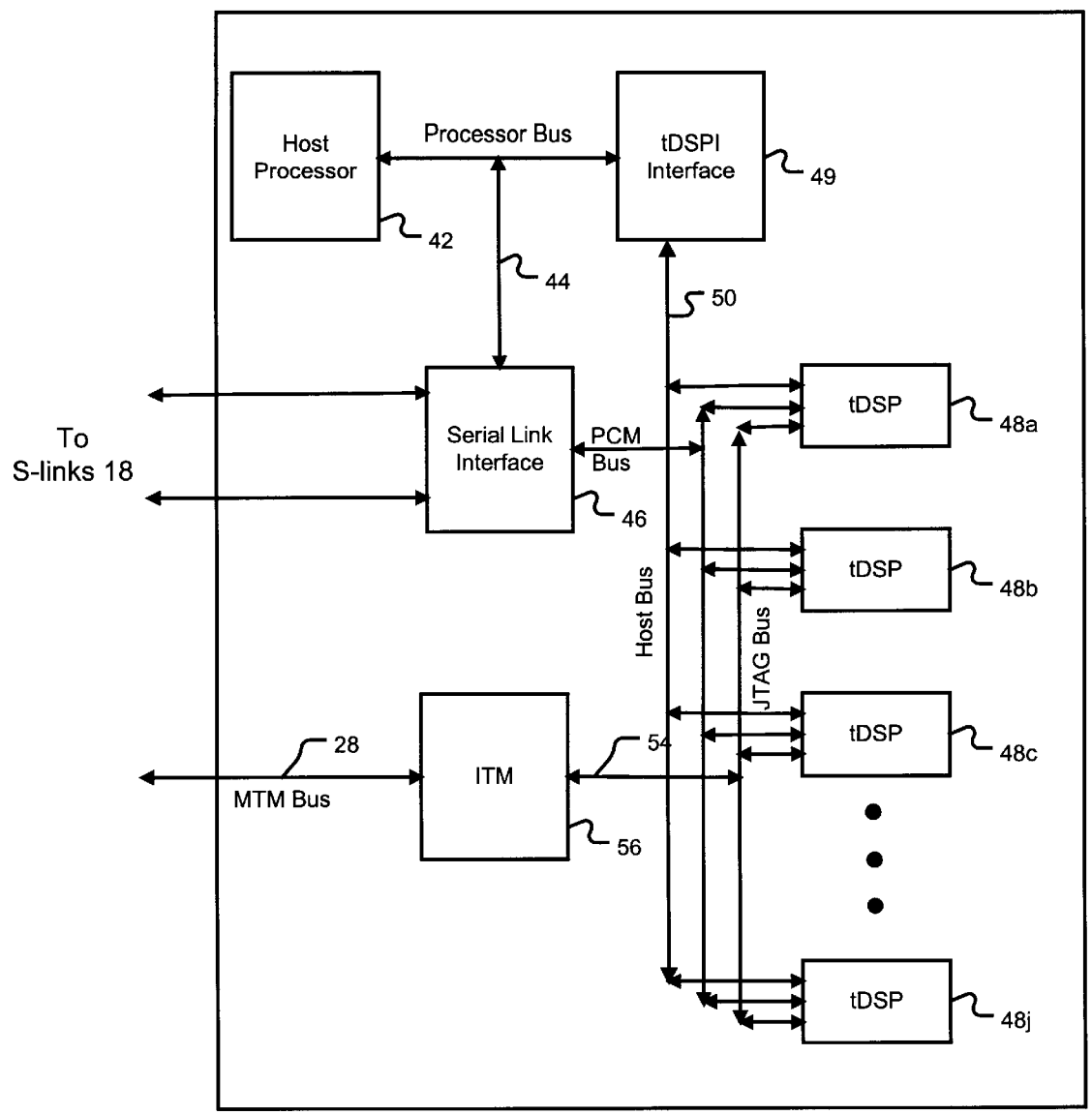
FIG. 3 is a block diagram of a further component of the system of FIG. 1.

FIG. 3 is a block diagram illustrating the architecture of VSP RM 19. VSP RM 19 comprises a host processor 42 which is preferably chosen as a Motorola MC68360QICC processor, having on board serial communications controllers, dynamic random access memory ("DRAM") interfaces, timers, a background debug mode port and direct memory access controllers. Host processor 42 further comprises four megabytes of flash memory for program storage and a further four megabytes of DRAM. Host processor 42 is interconnected by processor bus 44 to serial link interface 46 and controls the overall operation of VSP RM 19. Serial link interface 46 is an application specific integrated circuit ("ASIC") which provides logical point to point serial links between S-links 18, CEM 12, 14 and VSP RM 19. Also connected to processor 42 via processor bus 44 are ten dual processor turbo DSP islands (tDSPI) 48a to 48j also connected via host bus 50 to DSP island interface 49. PCM bus 52 further connects DSP islands 48a–48j. Intelligent test master ("ITM") ASIC 56 further interfaces DSP islands 48 using a JTAG bus 54 to MTM bus 28 of system 11.

The architecture of each DSP island 48 is illustrated in FIG. 4. Each DSP island 48 comprises a DSP interface 60 ASIC that captures and double buffers PCM data on selected timeslots of PCM bus 52. Bus 52 connects serial link interface 46 (FIG. 3) of the VSP RM 19 to DSP interface 60. DSP interface 60 further compands PCM data ($\mu$/A law to linear or direct in the received direction and linear to $\mu$/A law in the transmit direction). It further provides transmit and receive message FIFOs to facilitate messaging between the RM host processor 42 (FIG. 3) and DSP Processors 62 and 64. Finally, the interface provides bus arbitration between two processors 62 and 64. Each of the DSP islands 48 comprises an eighty MHZ DSP56303 DSP processor 62 and a further identical slave co-processor 64. Each of these processors provide approximately eighty MIPS of processing power at eighty megahertz. Moreover, each processor 62, 64 is provided with four kilobytes of on-chip program RAM and two kilobytes of on-chip X and Y Data RAM. The DSP processors 62, 64 are interconnected to each other and DSP interface 60 by an eighteen bit address and a twenty-four bit data DSP bus 66. Additionally, each DSP processor and DSP interface is interconnected to test and maintenance bus 54, which is connected to the MTM bus 28 of CEMs 12, 14 (FIG. 1) via "ITM" 56 (FIG. 2). Finally each DSP island 48 comprises 128K×24 bits of static random access memory ("RAM") 68 used for program and data space. Each DSP island 48 may receive program instructions from host processor 42. These program instructions may adapt the DSPs to provide any of a number of PCM digital signal processing services, including echo cancellation, DTMF detection or the like.

When a DSP island 48 provides echo cancelling services it may do so under software control to provide echo cancelling services, in accordance with a conventional DSP echo cancelling method, as for example described in U.S. Pat. No. 5,343,522. Each DSP island 48 is adapted to provide twenty-nine individual echo cancellers. A VSP RM configured to offer only echo cancelling services is referred to as an ECRM (an echo canceller resource module). While an ECRM may have a total of two hundred and ninety echo cancellers, only two hundred and eighty eight are available for use.

An individual echo canceller 81 is generically schematically illustrated in FIG. 5. As noted, twenty-nine such echo cancellers are embodied in each DSP island 48 on a VSP RM 19 (FIGS. 3,4), that is programmed to provide echo canceller services. Each echo canceller 81 comprises an input (Rin) 82 and an output (Rout) 84 for call data traveling from a far end call originator to a near end recipient by way of CEM complex 10. Similarly, echo canceller 81 comprises an input (Sin) 88 and an output (Sout) 86 for call data travelling from a near end recipient to the far end originator. Call data is presented by CEM complex 10 at Rin 82. This call data is used as a reference to identify echo in the opposite direction and is provided to echo canceller DSP 90, by tap 92. Call data from input Rin 82 exits at output Rout 84 without modification and is accepted by CEM complex 10 via PCM bus 52 (FIG. 4), serial link interface 46 and S-link 18. At CEM complex 10, the call data is switched to the near end recipient and to the near end echo path. This is typically where the echo originates. Signal from the echo path, as well as call data from the recipient, enter the canceller at Sin 88 again via S-link 18, serial link interface 46 and PCM bus 52. This call data and echo signal are processed by echo canceller DSP 90 to remove echo. The result exits the canceller at Sout 86, and is passed back to CEM complex 10 for switching to the far end call originator. As will be apparent, two bi-directional channels on S-link 18 are required for each echo canceller.

In operation, communications system 11 (FIG. 1) functions to switch telephony data, between RMs 16, and optionally the host communication system (not shown). Payload and messaging data is received by system 11, at interface RMs 16 and/or at host interface 20. System 11 processes 8000 frames of data per second. At this frame rate, data is passed from RMs 16 to CEM complex 10, by S-links 18. As noted, the S-links allow full duplex communication between CEM complex 10 and RMs 16, with separate physical links transporting data from and to RMs 16. Each physical S-link is adapted to carry two hundred and fifty six logical timeslots of data, each timeslot comprising twelve bits of data. The two hundred and fifty six timeslots are further divided into eight groups of thirty-two timeslots. The twelve bits of data typically represent eight bits of PCM data, two overhead bits, a one bit out-of band channel, and a spoiler bit. Each logical timeslot typically represents a separate channel (DS0) of PCM data.

If the number of channels to be transferred between CEM 10 and any particular RM 16 exceeds two-hundred and fifty six, additional physical S-links are used to interconnect that RM to CEM complex 10. As noted, an ECRM offers two hundred and eighty eight echo cancellers. As each echo canceller requires two channels, each requiring a logical timeslot, an ECRM requires a total of five hundred and seventy six timeslots, and therefore three (bidirectional) physical S-links.

In order to switch a DS0 channel from an origination to a destination, associated logical timeslots are transferred to bandwidth selector 36a (FIG. 2). If the application requires individual logical timeslots within a group to be switched (ie. rearranged) within that group or to another group, the group is passed to timeswitch 38. Timeswitch 38, switches the DS0 slots within the group and among groups. The group with switched timeslots is provided to bandwidth distributor 36b, which switches the group to a destination RM or the host. The arrangement of multiple matrices allows for use of a DS0 timeswitch 38 having a capacity lower than the overall bandwidth carried by S-links 18. Accordingly, not all groups of data provided to bandwidth selector 36a will be switched by timeswitch 38. Instead only appropriate data from active and non-redundant RMs is switched through timeswitch 38. As will be appreciated, this arrangement allows for the efficient switching of groups of data channels by bandwidth selector/distributor 36a, 36b between RMs 16.

For example, this arrangement conveniently allows for flexible redundancy of RMs. Bandwidth selector 36a assures that data from active RMs is provided to timeswitch 38, while switched data from timeswitch 38, is provided to active and redundant (inactive) RMs by bandwidth distributor 36b. In the event of failure of any active RM, data from a corresponding redundant RM may be provided to timeswitch 38. RMs 16 can be provisioned with various redundancy schemes, as required. One RM may serve as a redundant RM for one or more active RMs. In the event of a failure of an active RM payload data may be switched through a redundant RM. RM sparing is controlled by bandwidth selector 36a and bandwidth distributor 36b. For ECRMs, redundant RMs may be generic VSP RMs containing sufficient data in host processor 42 to configure each DSP island to offer any of a number of possible DSP services. Thus, upon sparing of an active ECRM with an inactive VSP RM, the inactive VSP RM is configured by CEM complex 10 by providing sufficient instructions to the host processor 42 associated with that VSP RM in order to configure the redundant VSP RM to offer DSP services identical to those offered by the active ECRM. Configuration information for each RM is stored within complex 10, so that in the event of a complete failure of a VSP RM, a redundant VSP RM may be properly configured to identically mirror a failed VSP RM.

Additionally, and advantageously, the flexibility of matrix 38 and bandwidth selector and distributor 36a and 36b enables resource pooling, allowing resources provided by RMs 16 to be allocated on a per-call (or per-channel) basis, as more particularly described in U.S. patent application Ser. No. 08/851,026. As disclosed, this resource pooling is particularly well suited to pooling echo cancelling resources.

To pool echo canceller resources, the availability of each echo canceller forming part of system 11 is tracked by software forming part of CEM complex 10. If a call switched by system 11 requires echo cancellation, the software first locates an available echo canceller; system 11 then switches the call to the located echo canceller; echo cancellation is applied at the echo canceller; and the call is switched back to complex 10 for further processing. While the call is in progress, the non-availability of the echo canceller associated with the call is noted by the software. Upon call completion, system 11 no longer utilizes the associated echo canceller and notes its renewed availability for other calls. The software thus keeps track of a pool of available echo cancellers at all times.

In the event a single echo canceller fails, its failure may be noted by the software within CEM complex 10 and its availability may be permanently removed from the pool. Echo canceller failure may be continuously monitored. Individual failed echo cancellers may be replaced with working echo cancellers in mid-call. A call associated with a failed echo canceller can simply be switched mid-call by CEM complex 10 from the failed canceller to a spare functioning canceller in the pool. As the number of available echo cancellers should exceed the typical call processing load for the communications system 11, numerous echo cancellers ready to operate in redundancy should be available in the pool at all times.

In the event an entire VSP RM 19 fails, a redundant RM may be "spared" in its place, and the resources provided by the failed VSP RM may be provided by a redundant VSP RM. Typically, a generic VSP RM 19 will first be configured to offer the exactly the same services offered by the previously active VSP RM: appropriate configuration commands/requests are issued by CEM complex 10 over an S-link 18 (FIG. 1). Host processor 42 (FIG. 3) loads configuration DSP processing software from its memory into RAM 68 of DSP islands 48 (FIG. 4) of the redundant VSP RM. Once configured, a generic VSP RM may function as an ECRM, having two hundred and eighty eight echo cancellers.

Once a redundant ECRM has been configured, CEM complex 10 spares the active ECRM by switching data previously destined from or to the active ECRM from or to the redundant ECRMs. As noted, traffic from and to an ECRM requires five hundred and seventy six DS0 channels in each S-link. These five-hundred and seventy six channels are grouped in eighteen groups of thirty-two channels on the S-links 18. The coarse matrices of bandwidth selector 36a and bandwidth distributor 36b (FIG. 2) allow the switching of groups. Thus, CEM complex 10 achieves sparing of an ECRM by using bandwidth selectors and distributors 36a and 36b to switch data previously associated with an active ECRM to a redundant ECRM.

As well, when an entire ECRM is spared, the echo cancellers associated with the active ECRM are removed from the pool of potentially available echo cancellers maintained by CEM complex 10. Once the active ECRM is replaced with a redundant ECRM, the echo cancellers associated with the redundant ECRM may be added to the pool of available echo cancellers. The echo canceller resource pool may be updated by modifying the list of echo canceller resource identifiers (also referred to as "resource module agents" or "resource agents") stored within CEM complex 10 to remove identifiers for the previously available echo cancellers on the active ECRM from the pool and add identifiers associated with the newly available echo cancellers associated on the redundant ECRM. Alternatively, echo canceller resource identifiers ("resource agents" or "resource module agents") associated with the active ECRM may simply be replaced with identifiers for the newly available echo cancellers on the redundant ECRM.

It has, however, been discovered that the failure of a single echo canceller on a ECRM may be indicative of imminent future failures of echo cancellers on that ECRM. As a single DSP island 48 (FIG. 4) provides twenty nine echo cancellers, failure of a single echo canceller may suggest future failure of the entire DSP island 48. Thus, a conservative approach to replacing failed echo cancellers might replace an entire ECRM upon failure of a single echo canceller. This approach may be further desirable, as CEM complex 10 may very efficiently spare an active ECRM with a redundant ECRM, by switching data to or from the active ECRM to and from the redundant ECRM using only bandwidth selector 36a and distributor 36b.

However, merely switching all data associated with an active ECRM to a redundant ECRM, as described above, will create a temporary disruption on all two hundred and eighty eight calls potentially associated with that ECRM. This is quite undesirable for calls not associated with failed echo cancellers. As noted, in order to effectively cancel echo, the DSP software implementing echo cancellation on each echo canceller on the redundant RMs must converge after calls are first switched to the redundant ECRM. An appropriate adaptive filter must first be formed. Callers on calls associated with failed and non-failed echo cancellers could thus notice the lack of available echo canceller services during ECRM sparing. This lack of service will manifest itself as the presence of a temporary echo on associated calls. The echo will persist until the echo cancellers on the redundant ECRM have converged. As noted this may take between two and three seconds depending on the nature of the call.

FIG. 6, illustrates the steps in a method employed by system 11 (FIG. 1) in order to avoid the lack of service on calls not associated with failed echo cancellers during ECRM sparing. Specifically, in step S602 the active CEM 12 senses a trigger event for sparing an active ECRM with a redundant ECRM. A trigger event may be the failure of an entire ECRM or a failure of any of the S-links 18 connecting complex 10 to the ECRM. Alternatively, a trigger event may be the failure of a threshold number of echo cancellers on a particular ECRM. Software governing operation of complex 10 may be adapted to keep track of operating statistics, including the number of failed echo cancellers on each ECRM. A conservative sparing strategy may require ECRM sparing as a result of the failure of a single echo canceller.

Once a trigger event is detected, in step S604 CEM complex 10 first determines whether a redundant VSP RM (FIG. 3) is connected to CEM complex 10 to offer the necessary echo cancellation services. If no redundant VSP RM is available, ECRM sparing is of course not possible. In the absence of a redundant VSP RM, CEM complex 10 may issue an alarm in step S606, by for example, providing a message to a host connected to system 11. The host, in turn, may issue an alarm to an operator by way of a terminal message or the like, indicating that further resources are required.

If a spare VSP RM is available, CEM complex 10 configures the VSP RM in step S608 by issuing a configuration command to host processor 42 of the spare VSP RM via an associated S-link 18. Host processor 42 in turn, initializes the VSP RM and loads the appropriate echo canceller software into DSP islands 48a–48j. At this time, both the redundant VSP RM and the active ECRM are configured to provide identical services. Of course, some of the services may no longer be available on the active ECRM as a result of any failures on the active ECRM.

In step S610, CEM complex 10 causes bandwidth distributor 36b (FIG. 2) to switch call data directed to the active ECRM, to the active ECRM and the redundant ECRM. That is, the matrix of bandwidth distributor 36b is configured to provide call data to be passed through active ECRM, to both the active ECRM and the redundant ECRM. Groups of timeslots destined for the active ECRM are replicated on the S-links associated with the redundant ECRM. Bandwidth selector 36a, however, continues to receive and use call data from the active ECRM. This received data is further processed at the CEM. The data output by redundant ECRM is simply not used. This is because during step S610 the echo cancellers on active ECRMs have converged while the echo cancellers on the redundant ECRM have not. As such, echo components of call data received by the host from the active ECRM will have been cancelled, for calls associated with functioning echo cancellers on the active ECRM. Until the echo cancellers on the redundant ECRM have converged, call data returned by the redundant ECRM will not have been subject to proper echo cancellation.

In order to avoid echo canceller service loss associated with the ECRM sparing, CEM complex 10 simply waits in step S612, until echo cancellers on the redundant ECRM have converged. As the amount of time required for echo canceller convergence will vary from call to call, CEM complex 10 should wait until a majority of echo canceller on a redundant ECRM have converged. This could be accomplished by probing individual echo cancellers at CEM complex 10 via S-links 18 and host processor 42. However, such probing may be impractical. As such, in step S612 complex 10 simply waits a predefined time, statistically known to allow a majority of echo cancellers to converge. This time is typically three seconds. Other time intervals anywhere between zero and ten seconds may be appropriate.

As the majority of echo cancellers on the redundant ECRM will have converged after the three second wait, those calls associated with this majority will experience no perceptible echo during the switch from active ECRM to redundant ECRM. For those calls for which echo canceller convergence takes more than three seconds, the duration of the experienced echo will be reduced by the time complex 10 waited in step S612.

Thereafter, in step S614, bandwidth selector 36b is reconfigured to switch data from the redundant ECRM to the complex 10 for further processing, effectively replacing the active ECRM with the redundant ECRM. Thus, the echo cancellers on the active ECRM are effectively (and logically) disconnected from complex 10, and echo cancellers on the redundant ECRM are logically connected in their place. Optionally, software in CEM 10 may then deactivate the formerly active ECRM, by sending appropriate instructions to the host processor 42 of the (formerly) active ECRM over an associated S-link 18.

As well, the list of available echo cancellers (ie. the echo canceller pool) maintained by the software in CEM complex 10 may be updated at this time to reflect the availability of a reduced number of redundant echo cancellers. Additionally, complex 10 may issue a notice that an ECRM has been effectively spared, by providing an appropriate message to a host connected to system 11. The host, in turn can notify an operator.

While the above method has been described as an isolated set of program steps, it will be understood that these steps may form part of a larger software system adapted to manage other features offered by system 11. Additionally, while the method has been described in the context of "sparing" modules having multiple echo cancellers, it will be appreciated that the method could be used to replace a single echo canceller in a system. A canceller may, for example, be replaced in response to instructions received from the host communications system. Moreover, while the architecture of a specific communications system have been described, a person skilled in the art will be appreciate that a variety of other architectures could be conceived to embody the invention.

It will be further understood that the invention is not limited to the embodiments described herein which are merely illustrative of a preferred embodiment of carrying out the invention, and which are susceptible to numerous modifications of form, arrangements of parts, steps, details and order of operation. The invention, rather, is intended to encompass all such modifications within its spirit and scope, as defined by the claims.

I claim:

1. A method of replacing a first active echo canceller in a communications system with a second echo canceller, said first echo canceller initially having an input connected to said system for receipt of call data from said system and an output connected to said system for provision of call data to said system, said method comprising the steps of:

a. activating said second echo canceller and providing call data at said input of said first echo canceller to inputs of both said first and second echo canceller;

b. waiting a determined amount of time; and c. disconnecting said output of said first echo canceller from said system and connecting an output of said second echo canceller to said system.

2. The method of claim 1, further comprising the step of:

d. deactivating said first echo canceller.

3. The method of claim 1, wherein said first and second echo cancellers comprise digital signal processors and step a. further comprises configuring said second echo canceller by providing echo canceller software to its digital signal processor, prior to providing said call data at said input of said second echo canceller.

4. The method of claim 1, wherein said determined time in step b. is between approximately two and four seconds.

5. The method of claim 1, wherein said determined time in step b. is determined by probing said second echo canceller and waiting until said second echo canceller is ready to cancel echo in said call data.

6. The method of claim 1, wherein steps a.–c. are performed after sensing a trigger event.

7. The method of claim 6, wherein said trigger event comprises receiving an external signal received from a host system connected to said communications system.

8. The method of claim 6, wherein said trigger event comprises failure of a third echo canceller connected to said system.

9. A communications switching system comprising:

a control module for receiving and switching call data;

an active echo canceller having an input and an output connected to said control module for exchange of call data and for cancelling echo in a call;

a redundant echo canceller connected to said control module; said control module comprising a switch for switching call data between said control module and said active and redundant echo cancellers;

a processor in communication with said switch and said active and redundant echo cancellers;

said processor adapted to monitor said system, and in response to a sensed trigger event:

a. activate said redundant echo canceller and switch call data at said input of said active echo canceller to inputs of both said active and redundant echo cancellers;

b. wait a determined amount of time; and c. disconnect said output of said active echo canceller from said control module and connect an output of said redundant echo canceller to said control module, after said determined amount of time.

10. The system of claim 9, wherein said sensed trigger event comprises failure of said active echo canceller connected to said system.

11. The system of claim 9, wherein said processor is adapted to probe said redundant echo canceller to determine if said echo canceller is ready to cancel echo, and said processor is adapted to wait until said redundant echo canceller is ready to cancel echo.

12. A telephone communications switching system comprising:

a control module for receiving and switching call data;

a first resource module comprising an active echo canceller having an input and an output connected to said control module for exchange of call data and for cancelling echo in a call;

a second resource module comprising a redundant echo canceller connected to said control module;

said control module comprising a switch for switching call data between said control module and said first and second resource modules, for processing at said first and second resource modules;

a processor in communication with said switch and said first and second resource modules;

said processor adapted to monitor said system and in response to a sensed trigger event:

a. activate said redundant echo canceller and switch call data at said input of said active echo canceller to inputs of both said active and redundant echo cancellers;

b. wait a determined amount of time; and c. disconnect said output of said active echo canceller from said control module and connect an output of said redundant echo canceller to said control module, after said determined amount of time.

13. The system of claim 12, wherein said first resource modules comprise a further plurality of active echo cancellers, and said second resource module comprises a further plurality of redundant echo cancellers.

14. The system of claim 12, wherein said sensed trigger event comprises failure of an echo canceller on said first resource module.

15. A telephone communications switching system comprising:

a control module for receiving and switching call data;

a first resource module comprising a first plurality of active echo cancellers each having an input and an output connected to said control module for exchange of call data and for cancelling echo in a call;

a second resource module comprising a second equal plurality of redundant echo cancellers connected to said control module;

said control module comprising a switch for switching call data between said control module and said first and second resource modules, for processing at said first and second resource modules;

said processor in communication with said switch and said first and second resource modules;

said processor adapted to monitor said system and in response to a sensed trigger event:

a. activate said plurality of redundant echo cancellers and switch call data at an input of each said active echo cancellers to an input of each said active and redundant echo cancellers;

b. wait a determined amount of time; and c. disconnect said outputs of said active echo cancellers from said control module and connect an output of each of said redundant echo cancellers to said switch to switch call data from said redundant echo cancellers to said switch, after said determined amount of time.

16. The system of claim 15, wherein said sensed trigger event comprises failure of one of said active echo cancellers.

17. The system of claim 15, wherein said sensed trigger event comprises previous failure of a threshold number of said active cancellers.

18. The system of claim 15, wherein said call data is channelized and said switch comprises first and second switching matrices each adapted to switch call data in groups of call channels, and wherein in response to said sensed trigger event, said processor switches said call data to and from said active and redundant echo cancellers using said first and second switching matrices.

* * * * *